Feb. 11, 1969   M. R. JEPPSON   3,427,171
METHOD AND APPARATUS FOR REDUCING DESICCATION EFFECTS
IN THE MICROWAVE PROCESSING OF UNSEALED FOOD PRODUCTS
Filed March 12, 1965
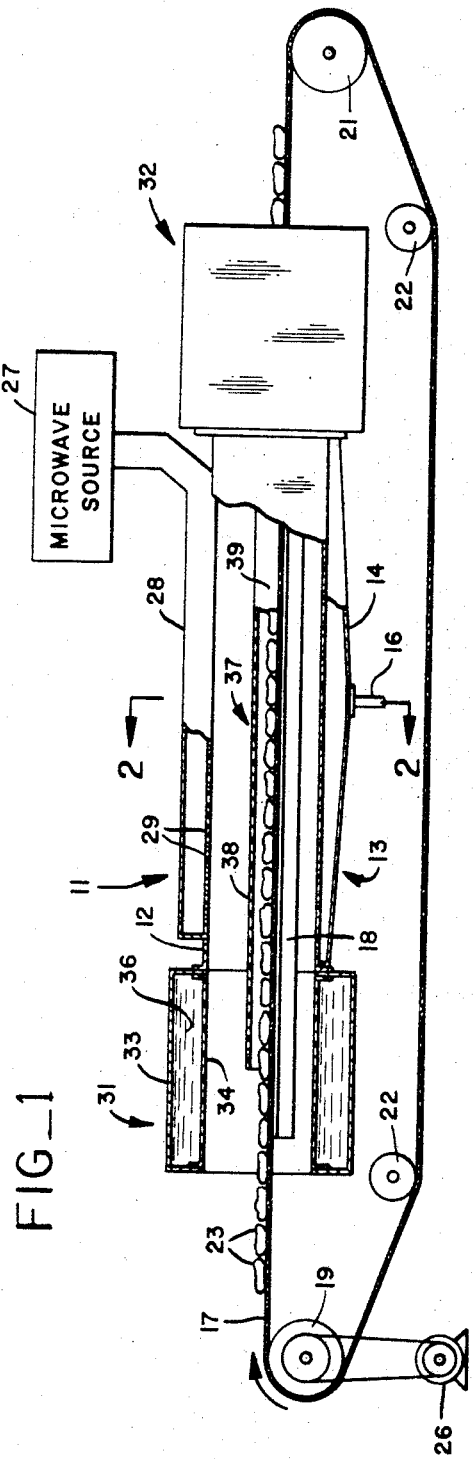
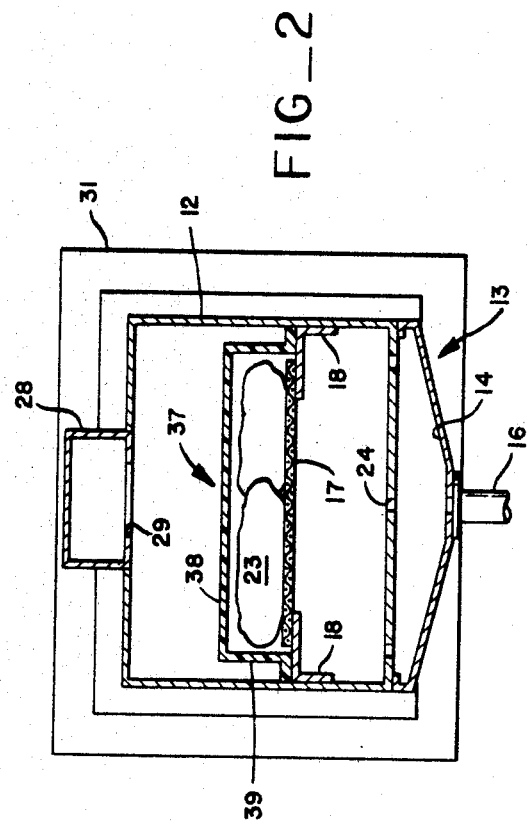
INVENTOR.
MORRIS R. JEPPSON
BY
William D. Hager
ATTORNEY Feb. 11, 1969  M. R. JEPPSON  3,427,171
METHOD AND APPARATUS FOR REDUCING DESICCATION EFFECTS
IN THE MICROWAVE PROCESSING OF UNSEALED FOOD PRODUCTS
Filed March 12, 1965
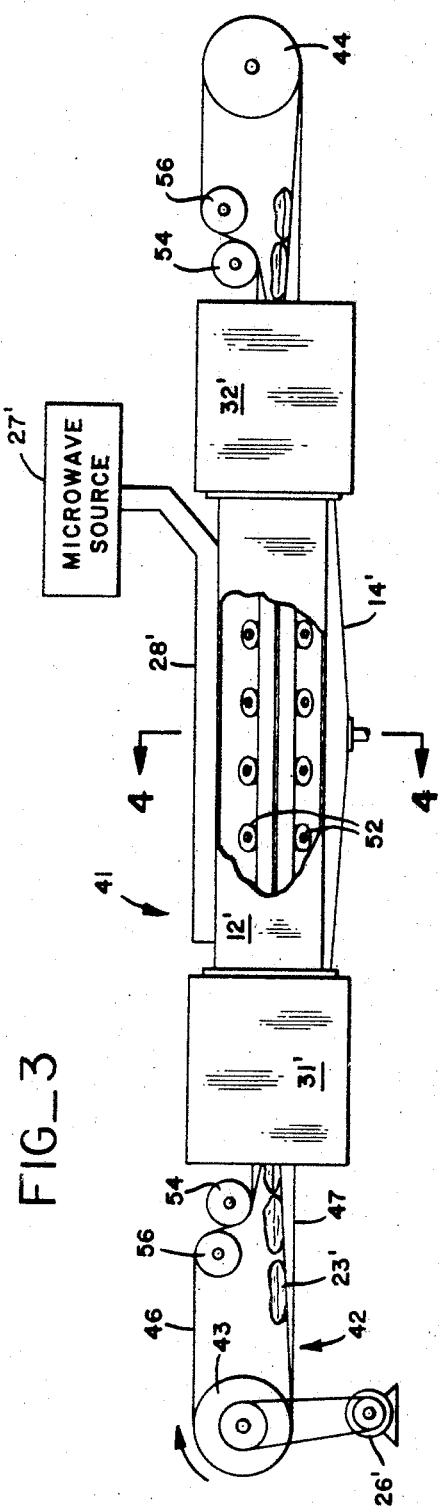
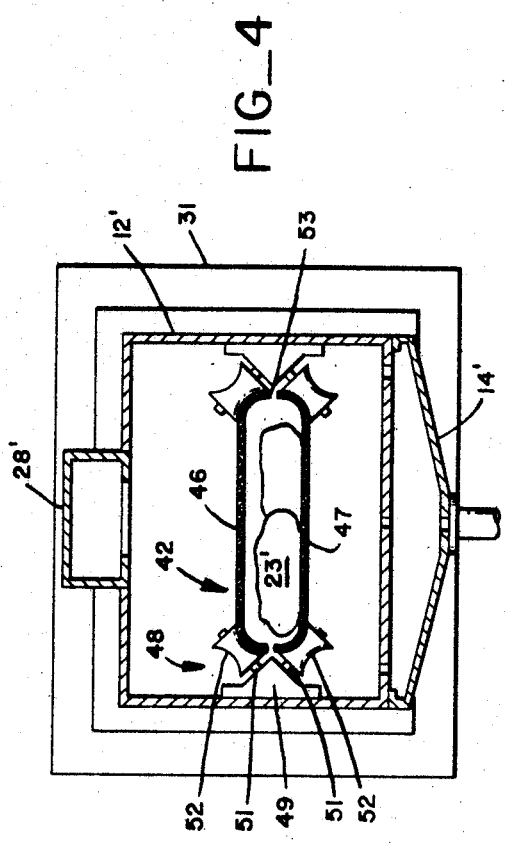
INVENTOR.
MORRIS R. JEPPSON
BY
William D. Hager
ATTORNEY

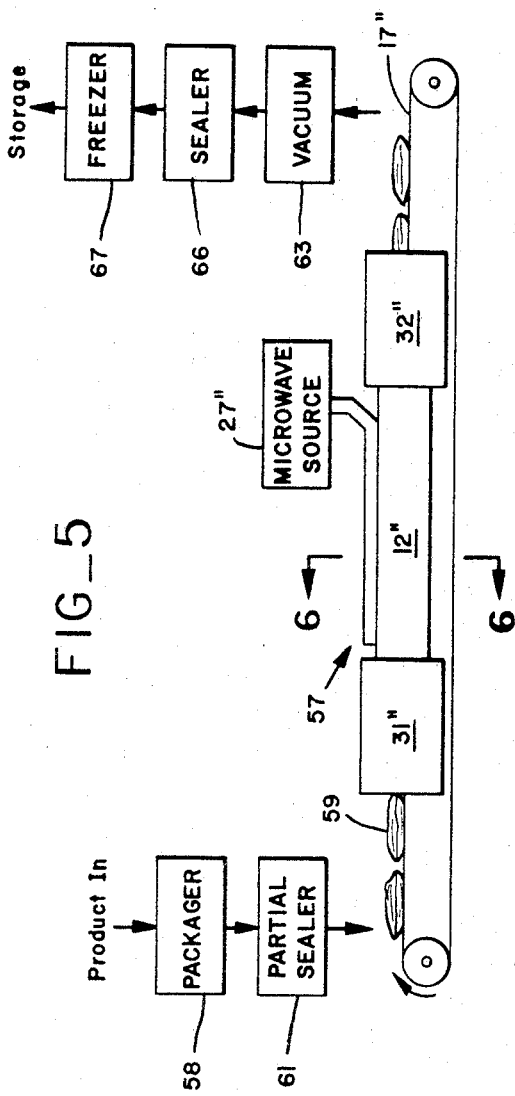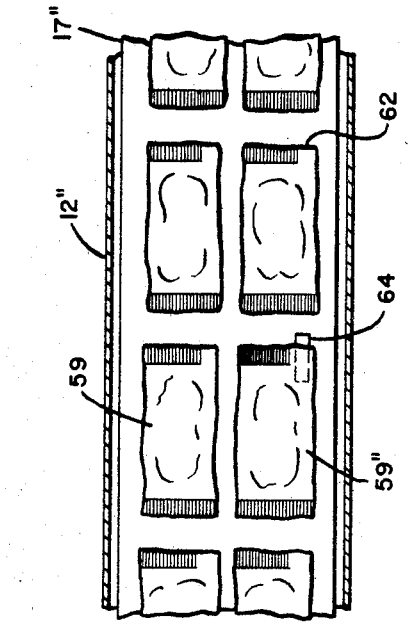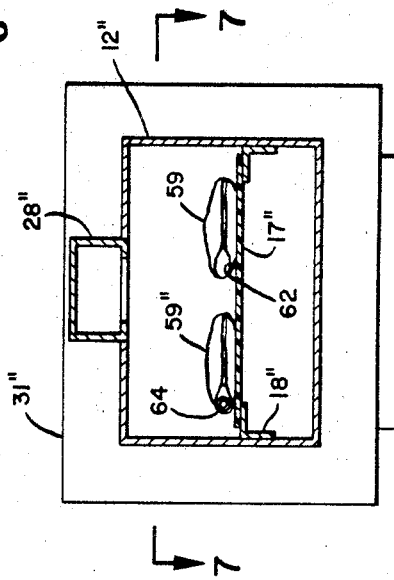

United States Patent Office 3,427,171
Patented Feb. 11, 1969

3,427,171
METHOD AND APPARATUS FOR REDUCING DESICCATION EFFECTS IN THE MICROWAVE PROCESSING OF UNSEALED FOOD PRODUCTS
Morris R. Jeppson, Alamo, Calif., assignor to Cryodry Corporation, San Ramon, Calif., a corporation of California
Filed Mar. 12, 1965, Ser. No. 439,216
U.S. Cl. 99—221
Int. Cl. A23l 3/32, 3/26; H05b 9/06
7 Claims

ABSTRACT OF THE DISCLOSURE

Heating unwrapped food by passing it through a conductor walled tunnel into which microwave energy is injected. The food is enclosed by a dielectric covering which reduces evaporation from the food.

---

The present invention relates to the heat treatment of food products by microwave energy for such purposes as sterilizing, blanching or cooking and more particularly to a method and apparatus for counteracting the undesirable effects which may result from drying during microwave treatment of foods.

Microwave heating has recently been applied to the food processing art as a very advantageous means for performing such operations as sterilizing, blanching, cooking and drying, and for other purposes which require heating of the food. Basic advantages of this heating method include the rapidity with which the product can be brought to a desired temperature and the fact that the heating can be almost uniform throughout the interior of the product. As a consequence, foods can be cooked, sterilized, blanched or otherwise processed in a very brief time, sometimes of the order of a few seconds. This not only expedites commercial food treatment from the cost and processing time standpoint, but also permits very significant improvements in the quality of the processed food. Many vegetables, fruits and meats can be sterilized, for example, without any substantial degree of cooking. The product resembles a fresh food rather than one sterilized by older processes such as conventional canning.

In more conventional heating techniques, the heat is applied only to the surface of the food. As food tissue does not, in general, have a high coefficient of thermal conductivity, this results in a high thermal gradient within the body of food. In order to adequately heat the center of the food volume, to sterilize the food for example, the surface must be seriously overheated. Where minimized or uniform cooking is desired, this effect reduces product quality.

The rapid and almost uniform heating produced by microwaves overcomes the foregoing problem and allows an optimization of product quality. However under some conditions microwave treatment may produce a somewhat opposite effect. Moisture may evaporate from a food during microwave treatment causing drying of the surface regions and a reversed temperature gradient due to the evaporative cooling of the surface. The temperature differential is not as pronounced as the opposite differential which occurs during ordinary heating but may still have undesirable effects on product quality.

The drying of the product surface may be undesirable in itself because of the resultant shrinkage, weight loss and the effects on taste, apparent freshness and other properties of the food. Further problems may arise from the surface cooling which accompanies drying. More particularly, to assure that the surface region of the food is heated sufficiently to effect the desired blanching, sterilization, cooking or other result, it may be necessary to overheat the center of the food.

The problems which result from drying do not occur when the food is subjected to microwave heating after being sealed into a container as disclosed, for example, in copending application Ser. No. 274,648, entitled Process for Sterilizing Food Products, filed Apr. 22, 1963 and now abandoned by the present inventor. Similarly, the drying effects are absent or minimal in batch process operations wherein the food is disposed within a small closed chamber during treatment. In both cases, the amount of moisture which can evaporate is minute or at least very limited.

The principal difficulties from surface drying are encountered where unenclosed foods are treated on a continuous process basis. Continuous process microwave systems may make use of an open tunnel through which the foods are carried by a conveyer. In this situation, moisture may freely evaporate from the food surface. As continuous processing is the most suitable system for large scale commercial food treatment, it is highly desirable that techniques be developed for eliminating the effects of surface drying in such operations.

The present invention provides a method and apparatus for overcoming the deleterious effects of drying during the microwave treatment, on a continuous process basis, of foods which have not been sealed into containers. This is accomplished by partially enclosing the food during the microwave treatment by a microwave transparent cover or other means which fits closely about the product to limit the free escape of water vapor therefrom. The envelopment of the product is not complete as this would result in a pressure rise and attendant complications in the process.

In a continuous process chamber of the type having a long tunnel and an endless belt conveyer extending therethrough, this may be accomplished by providing a dielectric shroud within the tunnel which fits over the conveyer and is preferably of just sufficient height to permit the passage of the product thereunder. A second and highly advantageous technique is to make use of the return loop of the conveyer belt. Normally, one portion of the conveyer extends through the tunnel to carry the product therethrough and the remaining or return portion of the belt is outside the tunnel. However, by arranging for the returning portion of the belt to extend back through the tunnel above the portion which is carrying the product, the belt itself effectively forms the vapor retaining shroud. By disposing rollers or other guides along the edges of the belt within the tunnel, the belt edges may be turned towards each other to provide a more complete envelopment of the product.

In still another variation of the invention, the partial enclosure of the product may be formed by the package or container in which the product will later be sealed. This is particularly useful where the container could not withstand the pressure accompanying heating after sealing or where subsequent operations are required which preclude sealing prior to heating.

It is frequently desirable, for example, to minimize cooking of the product by extremely rapid forced cooling immediately after blanching or sterilizing has been effected. The most effective form of such cooling consists of subjecting the product to a vacuum whereby the almost immediate evaporation of a small portion of the product moisture produces a very rapid temperature drop. Thus using the subject variation of the invention, the product may be disposed in plastic pouches which are then passed through the microwave tunnel in an unsealed condition. The open plastic pouch functions as the partial enclosure which prevents significant desiccation of the product and the accompanying bad effects. Immediately following the microwave heating, the unsealed pouches are passed briefly through a vacuum region in which rapid cooling occurs and cooking stops. The pouches are then sealed and thereafter function as the permanent package for the processed food. The result is an extremely high quality product obtained by a very efficient and economical technique.

Accordingly, it is an object of this invention to overcome the disadvantageous effects of drying during the microwave treatment of unsealed food products on a continuous process basis.

It is an object of the invention to provide a method and apparatus for obtaining a more uniform heating of foods by continuous process mocrowave treatment where the foods have not been sealed into containers.

It is still another object of the invention to provide a method and apparatus for assuring the cooking, sterilization or blanching of the surface regions of a food product during microwave processing without overcooking the central region of the food.

It is a further object of the invention to minimize shrinkage and weight loss of the product during microwave treatment of foods on a continuous process basis.

It is a further object of the invention to optimize the appearance, taste and texture of foods which are processed by microwave treatment prior to being sealed into containers.

It is a further object of the invention to provide a method and apparatus for reducing and controlling the evaporation of moisture from a food during microwave heating thereof.

It is a still further object of the invention to provide an efficient and economical method for vacuum cooling food products following continuous process microwave heating whereby cooking may be minimized.

The invention, with further objects and advantages thereof, will be better understood by reference to the following specification together with the accompanying drawings of which:

FIGURE 1 is a broken out elevation view of a continuous process microwave chamber having novel elements therein for practicing the invention;

FIGURE 2 is a cross sectional view of the apparatus of FIGURE 1 taken along line 2—2 thereof;

FIGURE 3 is a broken out view of a second continuous process microwave chamber having alternate means for practicing the invention including a unique conveyer system adapted to enclose a product during heating thereof;

FIGURE 4 is a cross sectional view of the apparatus of FIGURE 3 taken along line 4—4 thereof;

FIGURE 5 is a diagrammatic view illustrating still another method of practicing the invention;

FIGURE 6 is a cross section view of the microwave chamber shown in FIGURE 5 taken along line 6—6 thereof; and FIGURE 7 is a plan section view of a portion of the microwave chamber of FIGURE 6 taken along line 7—7 thereof.

Referring now to the drawing and more particularly to FIGURES 1 and 2 thereof, there is shown a continuous process microwave chamber 11 of the general type disclosed in copending application Ser. No. 245,010, filed Dec. 17, 1962 and now abandoned, by the present inventor and entitled, Continuous Process Microwave Heating Chamber. Basic elements of the chamber 11 include a long tunnel structure 12 formed of electrical conductor and having a rectangular cross sectional configuration. A drain sump housing 13 is disposed against the underside of the tunnel 12 and has a sloping floor 14 with a drain outlet conduit 16 at the lowest point.

In order to transport food products through the chamber 11, one section of an endless belt conveyer 17 extends therethrough with the return section of the belt passing beneath the chamber. The belt 17 is flat in this embodiment and the edges of the belt are supported at an intermediate level within the tunnel 12 by rails 18 which extend along opposite sidewalls thereof. The belt 17 is engaged upon rotating drums 19 and 21 at the input and output ends respectively of the tunnel 12 and additional rollers 22 guide the return section of the belt beneath the chamber. The drums 19 and 21 are spaced from the ends of the tunnel 12 to provide space for loading and removing the product 23.

Belt 17 is preferably formed of dielectric material in order that the microwave energy may penetrate therethrough. The belt 17 is formed to have distributed small openings therein, the number and extent of which are selected to allow excess water vapor to escape from the region of the heated product 23 while retaining sufficient moisture to provide the desired high humidity therearound. In the present embodiment, both of the foregoing conditions are met by forming the belt 17 of glass fiber screen fabric material or of a plastic such as "Mylar," a polyethylene terephthalate product of E. I. du Pont de Nemours & Co., with perforations therein.

The porosities in the mesh belt 17 also allow excess liquid to drain from the region of the product 23 to sump 13, through small openings 24 in the floor of tunnel 12.

To drive the conveyer belt 17, a variable speed motor 26 is coupled to drum 19. The microwave energy, from a suitable source 27, is injected downwardly into tunnel 12 through a waveguide 28 of the type described in copending application Ser. No. 308,284, filed Sept. 11, 1963 and now Patent No. 3,263,052 by the present inventor and intitled Power Distribution System for Microwave Process Chambers. The waveguide 28 extends longitudinally along the tunnel 12 and forms a portion of the top wall thereof. A series of transverse slots 29 in the waveguide 28 provides for a distributed injection of microwave energy downwardly into the tunnel at spaced apart points along substantially the entire length thereof.

The microwave energy is repeatedly reflected back and forth between the conducting upper and lower walls of the tunnel 12 and in this manner is gradually propagated towards the ends of the tunnel. In the course of these multiple passages across the tunnel, the microwaves repeatedly penetrate through the product 23 heating the food largely by interaction with the water content thereof.

To prevent the release of any significant amount of microwave energy from the open ends of the tunnel 12, terminating sections 31 and 32 are disposed at the input and output ends thereof respectively. The sections 31 and 32 are of the type described in the hereinbefore identified copending application Ser. No. 245,010 and are comprised of rectangular housings 33 which form extensions of the tunnel 12 of greater height and width than the central section thereof, the housings being formed of an electrical conductor. An inner wall 34, formed of dielectric material is provided in the housing 33 in spaced apart relation to the conducting outer walls thereof and a volume 36 of water or other lossy liquid is contained therebetween.

Energy which has propagated to the ends of the tunnel 12 without being absorbed by the product 23 will continue to move through the housing 33 by repeated reflections between the upper and lower conducting walls thereof. However such energy must take multiple passages through the lossy water volume 36 and is rapidly attenuated so that no significant amount of microwave is emitted from the chamber.

To enclose the products 23 above belt 17, a long cover 37, formed of dielectric material, is disposed within the tunnel 12. Cover 37 has an inverted trough-shaped configuration with a flat upper section 38 and side members 39 which extend downwardly to rest on rails 18 at each side of belt 17. Cover 37 has sufficient height to allow the product 23 to pass freely thereunder and preferably extends completely through tunnel 12 and at least partially through the terminating sections 31 and 32.

In operation, microwave source 27 is energized to inject energy into tunnel 12 as hereinbefore described and motor 26 is operated to drive the conveyer belt 17. The product 23 is then continuously loaded onto the belt 17 at the input end of the tunnel 12 and the processed food is continuously removed from the belt at the opposite end of the tunnel for packaging, freezing or such other treatment as may be required.

The objective of the heat processing within chamber 11 may variously be blanching, sterilizing, cooking or other effects which require the heating of a food. Different degrees of heating and duration of heating may be required for these purposes, the approximate optimum values for each result being known to the art. As different batches of a given product 23 may have somewhat varying properties, some trial runs and adjustments may be needed to optimize the processing in each case.

The time and extent of heating is dependent upon several factors which may be varied to adjust and control the process. These include the power output of source 27, the speed of conveyer belt 17 and the density of loading of the product 23 on the conveyer.

The effect of the partial enclosure of the product 23 by the dielectric cover 37 and porous belt 17 is to retain some evaporated water vapor around the product which would otherwise escape therefrom. This substantially reduces further evaporation from the product 23 and the consequent cooling of the surface of the product which would otherwise result. This causes the surface of the product to be heated to substantially the same extent as the interior. Accordingly it becomes unnecessary to overheat the center of the product in order to assure that the surface regions thereof are adequately blanched or sterilized, for example.

The beneficial effects are more completely realized where the cover 27 fits closely about the product 23 with only sufficient spacing to prevent interference with the movement of the product through the tunnel 12. Thus where a variety of foods are to be processed at different times, a series of covers of differing cross sectional configurations are provided so that the most appropriate one may be disposed in the tunnel for each run.

Typical foods which have been successfully processed by this technique, for blanching or sterilization, include vegetables such as spinach and broccoli, meats such as fish and chicken, and bakery products such as brown-and-serve rolls. In the precooking of fresh chicken parts prior to freezing, it was found that a shrinkage, by weight, of from 20% to 24% occurs where the meat is simply passed through the chamber without the partial enclosure of the present invention. In addition, the outer parts of the finished product are somewhat underdone and have an unattractive red tinged appearance. Upon being processed under essentially similar conditions with a dielectric cover over the conveyer as hereinbefore described, shrinkage was found to have dropped to approximately 12%. The product was much more uniformly cooked, was clearly more moist and tender, and had an appearance approximating that of chicken cooked by more conventional means.

Representative results for the precooking of fresh chicken parts with the dielectric cover over the conveyer were as follows:

| Product | Cooking Time | Final Temp. | Percent Shrinkage |
|---|---|---|---|
| Half breasts | 1 min. 50 sec | 190°±5° F | 16 |
| Thighs | 2 min. 45 sec | 204°±3° F | 8.5 |
| Do | 1 min. 50 sec | 180°±5° F | 11 |
| Wings | 1 min. 50 sec | 180°±8° F | 9 |

The starting temperature in each of the above cases was 60° F. Proportionately less shrinkage was observed where a lesser degree of heating is required. To facilitate deboning, chicken legs and thighs were heated, under the enclosed conditions, to a temperature of 160° F. with a processing time of approximately one minute. The meat was only slightly cooked but was readily removed from the bones. The weight loss was found to be only 3%.

Referring now to FIGURES 3 and 4 in conjunction, there is shown an alternate processing chamber construction for achieving a similar result. The chamber 41 includes a tunnel 12' having end terminations 31' and 32' at the input and output ends respectively, a drain sump housing 14' along the underside, and a waveguide 28 extending along the top and coupled to a microwave source 27' for injecting energy downwardly into the tunnel at spaced points along the length thereof. Each of the above specified elements may be similar to the correspondingly numbered elements of the embodiment of FIGURES 1 and 2 as hereinbefore described.

Chamber 41 differs from that previously described principally with respect to the conveyer system and associated mechanisms. The conveyer is comprised of an endless belt 42 mounted on drums 43 and 44 which are spaced from the input and output ends respectively of the tunnel 12'. In this instance both the upper and lower loops 46 and 47 respectively of the belt 42 extend through the tunnel 12' so that the belt itself may largely surround the product 23' to form the desired partial enclosure. To allow some escape of excess evaporated moisture from the region of the product 23', the belt 42 is formed of the hereinbefore described dielectric mesh material which should have a tight weave or a plastic coating to limit the porosity.

To guide the upper and lower loops 46 and 47 of the belt in such a manner as to enclose the product 23' within tunnel 12' a series of guide roller assemblies 48 are disposed along each side wall thereof at an intermediate level within the tunnel. Each such assembly 48 includes a support 49 secured to the sidewall of tunnel 12' and having two fixed axle pins 51 projecting therefrom, one pin being inclined upwardly at a forty-five degree angle and the other being inclined downwardly at a similar angle. Rollers 52 are mounted on the pins 51 to support and guide the edges of belt 42, the rollers being shaped to impart quarter circular bends to the edges of both sections 46 and 47 of the belt whereby the central sections of the belt are spaced apart to allow the product 23' to be disposed therebetween while the edges of the belt sections are turned towards each other to substantially complete the enclosure of the product. A slight spacing 53 of the belt edges must be provided to avoid friction between the oppositely travelling elements.

To provide adequate space at the entrance and exit ends of chamber 41 for loading and removal of the product 23', the upper loop 46 of belt 42 passes between a pair of guide drums 54 and 56 which are adjacent each end of the tunnel 12' and which are spaced well above the lower belt loop 47. The upper belt section 46 passes underneath the guide drum 54 which is closest to the tunnel 12' and above the second guide drum 56 so that the two sections of the belt 42 are widely separated near the ends thereof. A variable speed motor 26' is coupled to the primary drum 43 at the input end of the tunnel 12' to drive the conveyer.

In operation the products 23' are loaded onto the lower section 47 of belt 42 in the region between drum 43 and the adjacent drum 56 and are removed in the region between drum 44 and the adjacent drum 56. Chamber 41 operates to heat the products 23' in the manner hereinbefore described with reference to the embodiment of FIGURES 1 and 2 except insofar as the enclosing of the product during processing is accomplished entirely by the belt 42.

In many cases the most desirable method for providing a partial enclosure of the product during the microwave heating is to utilize the container in which the product is to be subsequently sealed and stored. If the container can be sealed prior to the microwave treatment then drying will not occur and the techniques of the present invention are not required. However there are many situations where this cannot be done. The container may not, for example, be of a type which could withstand the pressure increase. In other instances it may be necessary to perform some further operation on the product after the heating which requires direct access thereto. In these circumstances, the product may be disposed in the container which is then passed through the microwave chamber in an unsealed, or partially sealed, condition whereby the container functions as the partial enclosure.

A process of this type is shown schematically in FIGURES 5, 6 and 7, which illustrate the preparation of a product such as a green vegetable which is to be marketed as a frozen food in a plastic pouch. Such products should preferably be blanched prior to freezing by a very brief and rapid heating. To preserve the characteristics of a fresh food to the greatest possible extent, the heating should be immediately followed by a forced cooling. The most rapid cooling technique is vacuum cooling, a treatment which cannot be performed on a food which has been sealed into a container. Thus the techniques of the present invention are particularly advantageous for this type of food processing.

The process may utilize a continuous process microwave chamber 57 essentially similar to that hereinbefore described with respect to FIGURES 1 and 2 except that no cover over the conveyer is required. The chamber may include a tunnel 12″ having end terminations 31″ and 32″ for suppression of the emission of microwave energy from the tunnel and having a waveguide 28″ extending along the top and coupled to a microwave source 27″, such elements being similar to those previously described. As in the previous instance, a dielectric conveyer belt 17″ travels through the tunnel 12″ and is supported therein on rails 18″.

The cleaned and prepared fresh product is first passed through a packaging machine 58 where it is inserted into plastic pouches 59. The pouches are then passed through a suitable sealer 61 which partially seals the pouches but leaves one corner 62 thereof open as shown in FIGURES 6 and 7 in particular.

The partially sealed pouches 59 are next passed through the microwave heating chamber 57 to produce the desired blanching. If the product is fresh spinach leaves, for example, this may typically require heating to a maximum temperature of 185° F. with a passage time through the tunnel 12″ of 50 seconds. During the heating period the unsealed pouches 59 function to suppress excess evaporation of moisture from the product thereby insuring that the surface regions of the product are blanched, reducing shrinkage, and preserving the fresh texture and appearance.

Upon emerging from the heating chamber 57, the pouches are immediately passed through a vacuum chamber 63. The resulting sudden evaporation of a small amount of the moisture in the product causes a very rapid cooling which stops any further cooking of the product further insuring that the fresh food characteristics are preserved to the greatest possible extent.

If the nature of the pouches 59 or the product is such that rapid evacuation does not occur in the chamber 63, then plastic tubes may be inserted in the corners 62 of the pouches, prior to the partial sealing in sealer 61, and will function to hold the corner 62 open. For purposes of illustration, one pouch 59″ is shown with such a tube 64 in place in FIGURES 6 and 7. After passage through the vacuum cooler 63, the tubes 64 are removed. The evacuation step may also be accomplished by inserting a needle into the opening 62 and connecting this needle to a vacuum pump. After evacuation the needle is withdrawn and the opening sealed.

Following cooling, the pouches 59 are passed to a second sealing station 66 where the sealing is completed.

The sealed pouches are then passed through a freezer 67 and are ready for refrigerator storage and marketing.

While the invention has been described with respect to certain representative embodiments and examples, it will be apparent that many variations and modifications are possible within the scope of the invention and it is not intended to limit the invention except as defined in the following claims.

What is claimed is:

1. A method for heating unwrapped food products by microwave energy comprising passing said products continuously through a conductor walled tunnel by means of a conveyor extending therethrough, injecting microwave energy into said tunnel while reducing the evaporation of moisture from said foods by maintaining said products within a very close fitting dielectric partial enclosure spaced from said tunnel walls and of just sufficient height to permit passage of said food products thereunder while in transit through said tunnel, whereby the humidity in the region of the surfaces of said product is maintained at a high level without a substantial pressure increase therearound.

2. Apparauts for treating unwrapped food products with microwave energy comprising a long tunnel structure formed of electrically conductive material, a conveyor extending through said tunnel for transporting said food products therethrough, means for injecting microwave energy into said tunnel substantially at right angles to the axis thereof, and a product cover substantially the length of said tunnel and disposed within said tunnel and spaced from the tunnel walls and extending in very close adjacent position with respect to said conveyor and of just sufficient height to permit passage of said food products thereunder whereby a high degree of humidity is maintained around said products during the heating thereof, said cover being formed of electrically non-conductive material.

3. In apparatus for heating unwrapped food products by microwave energy, the combination comprising conductor walled means forming a long passage, a microwave source injecting microwave energy into said passage, a conveyor belt extending through said passage for carrying food products therethrough, said conveyor belt having perforations therein to release excess liquids and water vapor from the vicinity of said food product during said heating, and an inverted trough disposed within said passage over said conveyor in very close adjacent parallel relationship thereto and substantially the length of said passage for covering said food products thereon, said trough having side members which extend downwardly substantially to said belt whereby evaporated water is retained adjacent said food and drying thereof is minimized, said trough being formed of electrically non-conductive material whereby said microwaves penetrate therethrough.

4. Apparatus for heating unwrapped food products by microwave energy comprising a horizontal tunnel structure having walls formed of electrical conductor and having a drain at the bottom portion, means for injecting said microwave energy into said tunnel substantially at right angles to the axis thereof, a conveyor belt extending through said tunnel for continuously carrying said food products therethrough, said belt being a porous screen formed of dielectric material whereby excess liquids from said food products are transmitted to said drain, and an inverted stationary trough shaped cover disposed in closely adjacent position to said conveyor belt and in parallel relationship thereto and extending therealong for substantially the entire length of said tunnel whereby a high humidity is maintained around said food products during the heating thereof, said cover being formed of dielectric material whereby said microwave energy penetrates therethrough.

5. In apparatus for treating foods with microwave energy, the combination comprising a tunnel having walls formed of electrical conductor, means for injecting microwave energy into said tunnel, and an endless conveyor belt having a lower section extending through said tunnel for carrying said foods therethrough and having the oppositely travelling return section situated over said lower section to partially enclose said foods whereby a high humidity is maintained around said foods during said treatment, said belt being formed of dielectric material whereby said microwave energy penetrates therethrough.

6. Apparatus for treating foods with microwave energy as described in claim 5 and comprising the further combination of a plurality of guides disposed within said tunnel along the edges of at least one of said sections of said belt and positioned to turn said edges toward the other of the sections of said belt whereby said belt more fully encloses said foods.

7. Apparatus for heating food products with microwave energy on a continuous process basis comprising, in combination, a tunnel formed of electrically conductive material, means for injecting microwave energy into said tunnel substantially at right angles to the passage therethrough, an endless conveyor belt formed of dielectric material and having oppositely travelling upper and lower portions extending through said tunnel in spaced apart relationship whereby said foods may be carried through said tunnel on the lower portion of said belt with the upper section thereof forming a partial cover over said foods to retain evaporated moisture therearound, and a plurality of guide rollers distributed along the length of said belt within said tunnel and positioned to bend said edges of said upper and lower portions thereof into proximity whereby said foods are more completely enclosed.

References Cited

UNITED STATES PATENTS 3,261,140   7/1966   Long et al. _____ 53—22

FOREIGN PATENTS 1,145,285   3/1963   Germany.

RAYMOND N. JONES, *Primary Examiner.*

S. B. DAVIS, *Assistant Examiner.*

U.S. Cl. X.R.

99—386, 443; 219—10.55